United States Patent
Maryfield et al.

(10) Patent No.: US 10,408,935 B1
(45) Date of Patent: Sep. 10, 2019

(54) LONG-RANGE OPTICAL TAG

(71) Applicant: Cubic Corporation, San Diego, CA (US)

(72) Inventors: Tony Maryfield, Poway, CA (US); Michael Roes, San Diego, CA (US); Richard Trissel, Gualala, CA (US)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 16/392,873

(22) Filed: Apr. 24, 2019

Related U.S. Application Data

(60) Provisional application No. 62/662,476, filed on Apr. 25, 2018.

(51) Int. Cl.
| | |
|---|---|
| *G01S 17/02* | (2006.01) |
| *G01S 17/10* | (2006.01) |
| *G06K 19/07* | (2006.01) |
| *G02B 26/08* | (2006.01) |
| *G01S 7/484* | (2006.01) |

(52) U.S. Cl.
CPC ............ *G01S 17/023* (2013.01); *G01S 7/484* (2013.01); *G01S 17/10* (2013.01); *G02B 26/0841* (2013.01); *G06K 19/0723* (2013.01)

(58) Field of Classification Search
CPC .................................................. G01S 17/023
USPC ......................................................... 356/217
See application file for complete search history.

(56) References Cited

U.S. PATENT DOCUMENTS

| | | | |
|---|---|---|---|
| 6,778,779 B1* | 8/2004 | Shay ................. | H04B 10/2587 398/120 |
| 8,558,337 B2 | 10/2013 | Maryfield et al. | |
| 2001/0013967 A1* | 8/2001 | Tsumura .............. | H04B 10/40 398/170 |
| 2004/0179848 A1* | 9/2004 | Belenkii ............. | H04B 10/112 398/131 |
| 2006/0262319 A1* | 11/2006 | Gatt ...................... | G01H 9/00 356/492 |
| 2015/0009486 A1* | 1/2015 | Potemkin ............. | G01S 17/023 356/4.01 |
| 2015/0022826 A1* | 1/2015 | Cramer ................. | G01S 17/66 356/620 |
| 2015/0146196 A1* | 5/2015 | Huang ..................... | G01J 9/00 356/121 |
| 2019/0018227 A1 | 1/2019 | Maryfield et al. | |

* cited by examiner

*Primary Examiner* — Kara E. Geisel
*Assistant Examiner* — Omar H Nixon
(74) *Attorney, Agent, or Firm* — Kilpatrick Townsend & Stockton, LLP

(57) ABSTRACT

Embodiments disclosed herein address these and other issues by providing for an optical tag that uses an optical assembly with beam splitters to allow for simultaneous detection and retro-modulation, as well as the use of a camera to facilitate alignment of the optical tag with a laser interrogator. Additional components may be used to allow for a large aperture to be used, to help maximize light received by the optical tag and minimize diffraction of retro-modulated light, which can significantly increase distances at which the optical tag can operate. Moreover, a beam splitter may further be used to balance the light directed toward an optical sensor and a retro-modulator, to help achieve optimal results.

20 Claims, 5 Drawing Sheets

LONG-RANGE OPTICAL TAG

CROSS-REFERENCES TO RELATED APPLICATIONS

This application claims the benefit of U.S. Provisional Patent Application No. 62/662,476, filed Apr. 25, 2018, entitled "Large Aperture, Long-Range Optical Tag System Embodiment," which is assigned to the assignee hereof and incorporated by reference herein in its entirety.

BACKGROUND

Optical retro-modulators provide a unique means to transfer free space optical data without the need to generate and broadcast laser light, thereby saving much size, weight, and power at the retro-modulation and of an optical communication link between the optical retro-modulator and laser interrogator. Additionally, optical retro-modulators can be included in an optical "tag" with an optical receiver (which can detect and decode data received by modulated light from the laser interrogator, thereby enabling two-way communication between the optical tag and the laser interrogator.

Traditional optical tags, however, suffer various tradeoffs. In particular, trade-offs exist between optical aperture, field of view (FOV) and modulator size, the latter of which limits the speed. Typically, in view of these trade-offs, longer-range optical systems (e.g., optical systems in which the distance between a laser interrogator and an optical tag exceeds 500 m) typically resorts to "cooperative" free space optical communication systems in which an optical tag is replaced with a second laser interrogator, resulting in a laser interrogator at both ends of optical communication. Problematically, however, the setup is impractical in many scenarios.

BRIEF SUMMARY

Embodiments disclosed herein address these and other issues by providing for an optical tag that uses an optical assembly with beam splitters to allow for simultaneous detection and retro-modulation, as well as the use of a camera to facilitate alignment of the optical tag with a laser interrogator. Additional components may be used to allow for a large aperture to be used, to help maximize light received by the optical tag and minimize diffraction of retro-modulated light, which can significantly increase distances at which the optical tag can operate. Moreover, a beam splitter may further be used to balance the light directed toward an optical sensor and a retro-modulator, to help achieve optimal results.

An example optical communication device, according to the description, comprises an aperture configured to allow incoming light to enter the optical communication device, and a first beam splitter configured to split the incoming light into a first portion of light and a second portion of light, such that the first portion of light is directed toward a second beam splitter. The optical communication device further comprises the second beam splitter configured to split the first portion of light into a first sub-portion of light and a second sub-portion of light such that the first sub-portion of light is directed toward a retro-modulator, and the second sub-portion of light is directed toward an optical sensor. The optical communication device also comprises the retro-modulator configured to modulate and reflect the first sub-portion of light such that modulated and reflected light is directed out of the aperture via the second beam splitter and the first beam splitter, and the optical sensor configured to detect modulation of the second sub-portion of light.

An example method at an optical communication device, of detecting and retro-modulating laser light, according to the description, comprises receiving, at an aperture of the optical communication device, incoming light, wherein the incoming light is traveling in a first direction, and at least a portion of the incoming light includes the laser light. The method further comprises splitting the incoming light into a first portion of light and a second portion of light, and splitting the first portion of light into a first sub-portion of light and a second sub-portion of light such that: the first sub-portion of light is directed toward a retro-modulator, and the second sub-portion of light is directed toward an optical sensor. The method also comprises using the retro-modulator to modulate and reflect the first sub-portion of light, directing the modulated and reflected light out of the aperture of the optical communication device in a direction opposite the first direction, and using the optical sensor to detect modulation of the second sub-portion of light.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

Figure 1:
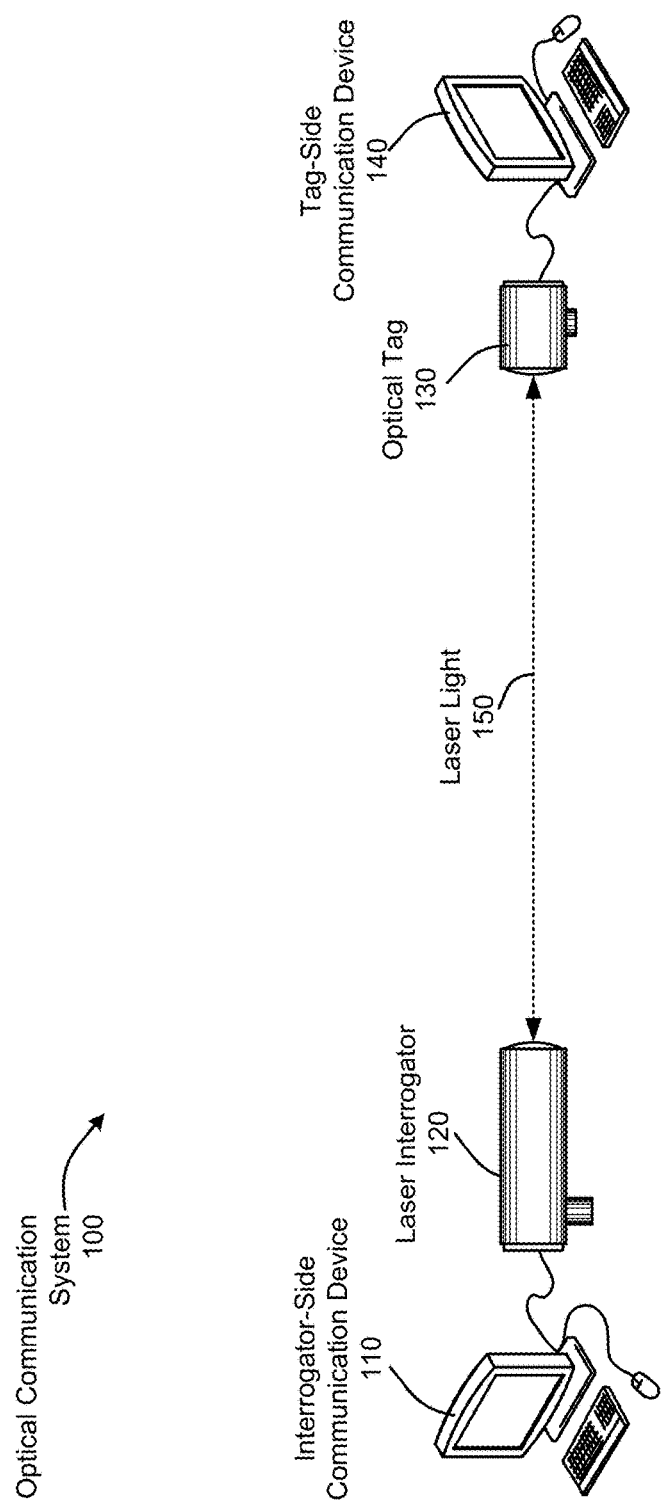
FIG. 1 is a simplified diagram of an optical communication system, according to an embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Optical tags provide unique means to transfer free space optical data in two directions by modulating and reflecting laser light emitted by a remote laser interrogator. This type of optical communication can have various advantages over radio frequency (RF), providing directional communication often with higher data rates than RF communication, and less susceptibility to jamming or other interference. It can also provide other advantages, such as reduced radiation hazard and power consumption. As such, optical communication can be a preferred type of communication in military and other applications. In particular, free space optical communications, man-worn combat identification or other approaches that benefit from small confined locations with low size, weight, and power requirements.

Applications can vary, according to various embodiments. In some applications, for example, the optical tags described herein may enable a communication system in which tags are located on air vehicles and communicate with and/or relay information from terrestrial nodes having laser interrogators. In other embodiments, the optical tags may be located on the terrestrial nodes and the laser interrogators on the air vehicles. (Here, the term "node" refers to a device communicatively linked to one or more devices in a communication system, the communication system comprising the communicatively linked devices.) Nodes may engage in tracking, and the sequence of engaging the optical tag for communications with a distant laser interrogator may be to acquire the target, track the target, and transmit the payload until the target becomes too far away to close the link or the line of sight is interrupted.

Alternative applications may exist. Such applications may include, for example, other applications within the military, commercial applications, and/or consumer applications. The optical tags disclosed herein may be part of a long-range optical communication system used as part of an infrastructure system to augment an RF system (poor weather), or bridge areas unavailable for fiber optics from point to point. Ultimately, the optical tags disclosed herein may be utilized in any application in which free space optical communication may be advantageous. In some embodiments, many free space optical channels may be brought into one location using an array of optical tags that can track many client laser interrogator sources.

FIG. 1 is a simplified diagram of an optical communication system 100, according to an embodiment. Here, the optical communication system 100 comprises an interrogator-side communication device 110, laser interrogator 120, optical tag 130, and tag-side communication device 140. Data is communicated between the laser interrogator 120 and optical tag 130 via modulated laser light 150. It can be noted that, for simplicity, communication devices 110 and 140 are illustrated as computer systems, but embodiments may vary. Embodiments of an optical communication system 100 may include any of a variety of types of communication devices that may be used in addition or as an alternative to the computer systems illustrated. More generally, the optical communication system 100 may enable two different electronic devices to communicate with each other over free space using non-radio frequency (RF) means. In some setups, for example, a tag-side communication device 140 may comprise a video camera, in which case the optical communication system 100 can operate to communicate video from the video camera to the interrogator-side communication device 110. Other tag-side communication devices 140 may include, for example, a server or other device providing a network connection, a computer device, one or more sensors, etc. Because embodiments of an optical tag 130 provided herein offer relatively low size, weight, and power, embodiments can be utilized in low power applications, such as in lightweight airborne drones, other unmanned aerial vehicles (UAVs), aircraft, terrestrial applications, etc.

The optical communication system 100 operates generally as follows. The laser interrogator 120 emits a laser light 150 that illuminates the optical tag 130, and the optical tag 130 reflects the laser light 150 back to the laser interrogator. The laser light 150 emitted by the laser interrogator 120 and/or reflected by the optical tag 130 may be modulated, enabling for two-way communication between the interrogator side communication device 110, and the tag-side communication device 140.

For example, to send data to the tag-side communication device 140, the interrogator-side communication device 110 can provide the data to the laser interrogator 120 via a communication link between the interrogator-side communication device 110 and the laser interrogator 120. This communication link can be any of a variety of types of communication links, depending on desired functionality, such as an electrical connection (e.g., a universal serial bus (USB) connection), a wireless connection (e.g., Bluetooth, Wi-Fi, etc.), an optical datalink (e.g., via fiber optics), etc. The laser interrogator 120 can send laser light 150 that has been modulated with the data from the interrogator-side communication device 110.

A similar process is followed to allow the tag-side communication device 140 to send data to the interrogator-side communication device 110. Here, the tag-side communication device 140 provides the optical tag 130 with the data (e.g., via a communication link similar to the communication link between the interrogator-side communication device 110 and the laser interrogator 120). The optical tag 130 then modulates laser light 150, sent from the laser interrogator 120, with the data provided from the tag-side communication device 140. The laser interrogator 120 an optical tag 130 can follow a schedule or established protocol to synchronize communications. During periods of time in which the optical tag 130 is scheduled to communicate information to the laser interrogator 120, the laser interrogator 120 may provide a continuous wave and/or series of known pulses that the optical tag 130 can then modulate.

Optical tags 130 can vary in size, shape, and functionality. As previously indicated, optical tags 130 often need to balance trade-offs between optical aperture, FOV, and modulator size. For example, for-aperture modulators are typically large and often become too slow for useful data communications. Modulators utilizing a-I combination offer larger apertures, but typically at the expense of lower FOV, and they also typically fail to achieve data rates that are competitive with "cooperative" communication systems in which both sides of the optical communication system 100 include laser sources.

Embodiments of an optical tag 130 described herein provide for a multi-functional long-range optical tag that utilizes an optical receiver, retro-modulator, and camera viewing/tracking system into a compact form factor. This arrangement can help ensure co-aligned apertures and a convenient means to intercept carrier laser pulses from the laser interrogator 120 (which can be many kilometers away). Depending on aperture, the tag scope could achieve, for example, a 0.25° FOV for a 100 mm aperture, yielding a 3× improvement over traditional optical tags 130.

Figure 2A:
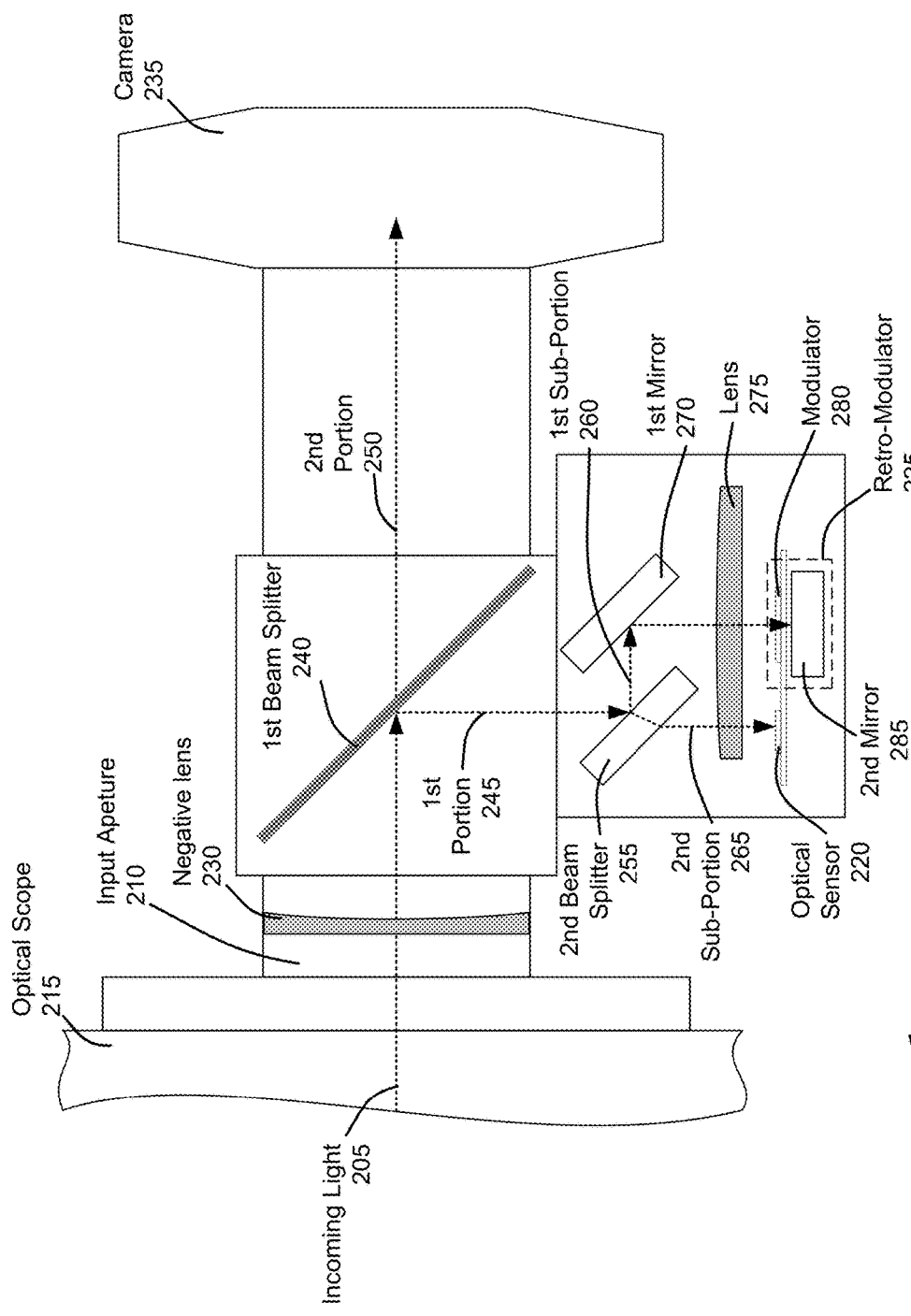
FIGS. 2A-2B are illustrations of how light travels through an optical assembly, according to an embodiment.
Figure 2B:
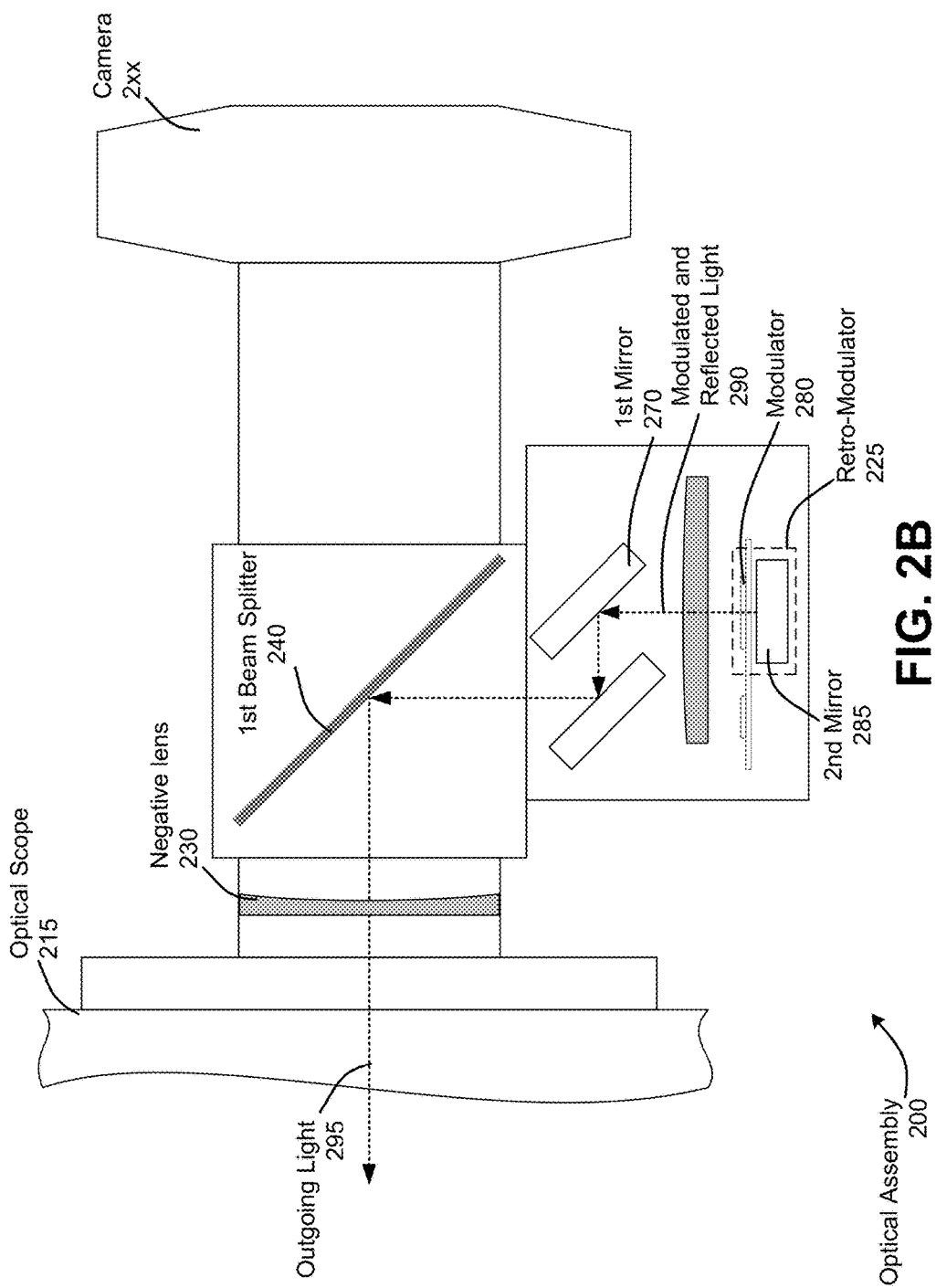

FIGS. 2A and 2B are simplified illustrations of an optical assembly 200 of an optical tag 130, which can provide such benefits, according to embodiments. As with other figures provided herein, FIGS. 2A and 2B are provided as a non-limiting example. It will be understood that the various distances and sizes of components illustrated in FIGS. 2A and 2B are not drawn to scale. Moreover, alternative embodiments may add, omit, combine, separate, and/or rearrange the various components illustrated. A person of ordinary skill in the art will appreciate such variations.

FIG. 2A illustrates how incoming light 205 travels through the optical assembly 200. Here, incoming light enters through an input aperture 210, which may be configured to be coupled with an optical scope 215. The optical scope 215 may comprise a telescope, enabling the optical tag 130 to adequately communicate with a long-range target, which may be several kilometers away. The optical scope 215 can comprise a Common Off The Shelf (COTS) telescope, such as a common Cassegrain reflector telescope (which uses a "folded" optic that can help decrease the overall size of the optical tag 130), although specialized optical equipment may be used. In particular, because COTS telescopes often have a very long focal length, a specialized optical scope 215 can be utilized with a smaller focal length, thereby facilitating the ability of the optical assembly 200 to focus the incoming light 205 onto the optical sensor 220 and retro-modulator 225 (both of which are discussed in more detail below), which can result in gains in bandwidth and/or FOV. Nevertheless, in applications where such added bandwidth or FOV is not necessary, embodiments may utilize an optical sensor 200 and retro-modulator 225 with a relatively large surface area, which may obviate the need for a reduced focal length.

The size of the aperture (not shown) of the optical scope 215 can vary, depending on desired functionality. In some embodiments, for example, the diameter of the aperture may be 90 mm. Other embodiments may utilize an optical scope 215 with a larger or smaller aperture. The performance of the optical tag 130 in which the optical assembly 200 is incorporated may be limited in large part by the diffraction of the reflected laser light (shown in FIG. 2B, and discussed in more detail below), which is inversely proportional to the size of the aperture of the optical scope 215. For applications in which the laser light 150 is horizontally communicated through the atmosphere, however, natural diffraction limits may result in diminished returns as the size of the aperture gets larger than 90 mm. The use of a Cassegrain telescope can provide a low size, weight, power, and cost (SWAP-C) sufficient long-range communications for many applications. Additional description of the aperture of the optical scope 215 is provided below.

Once incoming light 205 enters the input aperture 210, the light may pass through a negative lens 230, according to some embodiments. Embodiments may utilize a negative lens 230 to lengthen the focal length of the optical scope 215 to accommodate the requirements of other optical components in the optical assembly 200. In particular, based on the input optical requirements of the camera 235, the negative lens 230 may be used in the optical assembly 200 as illustrated in FIGS. 2A and 2B.

The incoming light 205 is then split by a first beam splitter 240 into two portions. A first portion 245 is directed toward the optical sensor 220 and retro-modulator 225, while a second portion is directed toward the camera 235. According to some embodiments, the first beam splitter 240 may comprise a dichroic beam splitter that acts as a wavelength-dependent optical splitter to separate laser light from visible light. That is, laser light 150 generated by the laser interrogator 120 may be infrared (IR) or part of another spectrum not visible by the human eye, such as 1550 nm. As such, the first beam splitter 240 can be configured to separate the laser light from visible light by either reflecting the infrared light and transmitting the visible light (as illustrated in FIGS. 2A and 2B), or vice versa (in which case the camera 235, optical sensor 220, and retro-modulator 225 can be re-positioned accordingly).

For its part, the camera 235 can be used to help aim the optical tag 130 toward the laser interrogator 120 by taking images from the second portion 250 of the light (e.g., the visible portion of the incoming light 205). The camera 235, which may comprise a pixel array (not shown) (e.g., a complementary metal oxide semiconductor (CMOS)-based or similar array) and may comprise a separate optical assembly (not shown) to focus the second portion 250 of light onto the pixel array, can be connected with a display or video output, enabling a user to aim the optical tag 130 accordingly. (According to some embodiments, the laser interrogator may have a visible light laser (e.g., a red laser) bore-sighted and/or coaxial with the laser light 150 generated by the laser interrogator 120, making the laser interrogator source visible from the camera 235, even in bright daylight.)

In some embodiments, the optical tag 130 additionally may be equipped with automated tracking functionality, capable of using a series of input images from the camera 235 to track the laser interrogator 120 over time. Embodiments may additionally include a processing unit configured to perform the tracking, and to further operate a motorized gimbal (not shown) to help ensure the optical tag 130 is sufficiently aimed toward the laser interrogator 120, to maintain optical communication. In some embodiments, the processing unit may additionally or alternatively perform scanning (e.g., by causing the gimbal to perform scanning patterns, such as spiral, rasterized, or other patterns) using the optical tag 130. In some instances, if the scanning results in detection of light (visible or infrared) from a laser interrogator 120, the processor may then cause the optical tag 130 to engage in tracking the interrogator laser source (e.g., using images from the camera 235, as previously described).

Moreover, for embodiments employing scanning and/or tracking, a separate, large FOV retroreflector (e.g., having an FOV of 120°) may be used for initial tag acquisition by the laser interrogator 120. This separate retroreflector can return a strong return glint of light to the laser interrogator 120. In some embodiments, the motorized gimbal of the optical tag 130 may be communicatively coupled with the laser interrogator 120 (e.g., via a relatively low-bandwidth order wire radio link), in which case, after receiving the return glint of light from the retroreflector, the laser interrogator 120 then returns an order wire command to provide relative positions of the laser interrogator 120 and optical tag 130, enabling the gimbal to point back to the direction of the laser interrogator 120, perform scanning to acquire the laser interrogator 120, and enable the high speed modulation capabilities. Tracking can be performed using, for example, angle sensors (cameras, quad cells, nutating laser beams, etc.). A one degree aiming precision may be achieved simply with low cost components.

That said, other embodiments may implement a simpler design. In some embodiments, for example, the camera 235 may be omitted entirely. Instead, embodiments may utilize a set of optics that provide an eyepiece for the user to make adjustments manually by looking into the eyepiece and aiming the optical tag 130 toward the laser interrogator 120.

The first portion 245 of light (the portion not directed toward the camera 235) is directed toward a second beam splitter 255, which separates the first portion 245 into two different paths, a first sub-portion 260 that is directed toward the retro-modulator 225, and a second sub-portion 265 that is directed toward the optical sensor 220.

According to some embodiments, the second beam splitter 255 may direct a majority of the first portion 245 of light toward the retro-modulator 225. This is because light directed toward the retro-modulator 225 is then reflected (and modulated) back through the optical assembly 200 and toward the laser interrogator 120 (which itself has a receiver to detect the reflected light). On the other hand, the optical sensor 220 may be sufficiently sensitive that it may not need a large amount of light to sufficiently detect laser light for incoming communication from the laser interrogator 120. Various factors may come into play when determining the proper split of light between the first sub-portion 260 and second sub-portion 265, such as dynamic range of the optical sensor 220, operating range of the retro-modulator 225, the operating range of an optical sensor at the laser interrogator 120, and the like. In some embodiments, for example, the second beam splitter 255 may direct at least 90% of the first portion 245 of light toward the retro-modulator 225. (In other words, the first sub-portion 260 may comprise at least 90% of the first portion 245 of light.) In other embodiments, this may be 95% or more.

In some embodiments, the first sub-portion 260 of light may be directed toward the retro-modulator 225 using a first mirror 270 and a lens 275. It can be noted, however, that alternative embodiments may use an arrangement of components different than that illustrated in FIGS. 2A and 2B. For example, for embodiments in which the second beam splitter 255 transmits most of the light (e.g., 90%) and reflects the rest, the location of the retro-modulator 225 in FIGS. 2A and 2B may be switched with the location of the optical sensor 220. Additionally or alternatively, embodiments may omit the first mirror 270 and/or include additional mirrors, lenses, and/or the like, to direct the first sub-portion 260 to the retro-modulator 225 and the second sub-portion 265 to the optical sensor 220.

The optical sensor 220 may comprise any of a variety of types of sensors capable of detecting modulated laser light in the incoming light 205. For example, where the laser interrogator 120 generates a particular band of IR light, the optical sensor 220 may be configured to detect the band of IR light. Because the size of the optical sensor 220 is directly proportional to the resulting FOV, some embodiments may use a relatively large optical sensor 220 (e.g., 1 or 2 $mm^2$, for example) to result in a relatively large FOV. According to some embodiments, the optical sensor 220 may comprise a PIN photodiode, avalanche photodiode (APD), and/or other photosensitive component coupled to an amplifier.

As previously mentioned, the dynamic range of the optical sensor 220 may be taken into account when determining the proportion of light to provide to the optical sensor 220 (as determined by the second beam splitter 255). Atmospheric scintillation can provide a significant variation in the amplitude of the incoming light 205, and corresponding measures may be taken so that the optical sensor 220 can accommodate such simulations. Some optical sensors, for example, may result in a "double pulse" when exposed to light in excess of the maximum of its dynamic range, in which case it may be preferable to provide such sensors with less light. Other optical sensors may be capable of being exposed to much more light without double pulsing or providing any other erratic output. Because modulation of the laser light can be binary, the linear operating range of any amplifier of the optical sensor 220 may be of less importance than the dynamic range of the amplifier. In some embodiments, circuitry and/or optics providing active gain control may be used to help ensure the integrity of data received at the optical sensor 220.

In some embodiments, the optical sensor 220 may be coupled to an immersion lens (in which the lens is optically contacted with the optical sensor 220), enabling the optical sensor 220 to have a relatively wide FOV. An example of an optical sensor with an immersion lens can be found in U.S. Pat. No. 8,558,337, entitled "WIDE FIELD OF VIEW OPTICAL RECEIVER," which is hereby incorporated by reference in its entirety for all purposes.

The retro-modulator 225 may comprise a modulator 280 coupled with a second mirror 285, which operate to reflect and modulate the first sub-portion 260 of light to enable communications back to the laser interrogator 120. To help ensure retro-reflection, the optics may be telecentric (and as such, may include an aperture stop (not pictured)), such that the light is telecentrically directed toward the second mirror 285. This telecentricity can help ensure that light reflected by the second mirror 285 follows the same (or substantially the same) light path back toward the laser interrogator 120.

The modulator 280 may comprise a multiple quantum well modulator (MQWM) (or, more generally, a quantum well modulator (QWM)) positioned in the path of the first sub-portion 260 of light, in front of the second mirror 285, such that the first sub-portion 260 of light travels through the modulator 280. In some embodiments, the MQWM may employ a flip-chip design in which the MQWM is implemented in a semiconductor that is transparent (or substantially transparent) to the first sub-portion 260 of light, and is able to modulate the light with the application of an electric voltage, modulating the intensity of the light as it passes through the semiconductor. Because modulation speed typically increases with the decrease in size of the modulator 200, the size of the modulator 280 (and the optics, such as the lens 275, that focus the first sub-portion 260 onto the second mirror 285 and through the modulator 280) may be selected based on the requirements of the application.

As with the optical sensor 220, the size of the modulator 280 can impact the FOV of the optical tag 130. Because a larger size reduces bandwidth, applications may have to accommodate this trade-off between the FOV and bandwidth. That said, a relatively large modulator having a services area of 6 $mm^2$ can provide a bandwidth of 1.5 Mbps or more, which is sufficient to communicate high-definition video in many cases. Moreover, the corresponding FOV is also relatively large (e.g., 0.5° or more), which can be beneficial in many applications.

That said, other embodiments may employ smaller modulators 280. One such modulator 280 that can provide a relatively large FOV relative to its size is described in detail in U.S. Patent Application No. in, filed Jul. 5, 2018, entitled "LARGE APERTURE, HIGH-SPEED OPTICAL TAGS," the entire content of which is herein incorporated by reference for all purposes. In such embodiments, an increased aperture-to-modulator ratio (3× that of traditional optical tags) by optically contacting a small, high speed quantum well modulator (QWM) to a silicon lens (e.g. an immersion lens). The nearly matched index of refraction of both devices at 1550 nm couples the light into the lens and results in an effective 3× increased optical field of view. This effect results in much smaller QWM devices (higher speeds) for the same equivalent exit aperture. Embodiments may achieve, for example, modulation speeds in excess of 1 Gbps (e.g., up to 10 Gbps), with apertures of up to 100 mm (or more).

It can be noted that, although the optical sensor 220 and retro-modulator 225 are illustrated as sharing a single lens 275, alternative embodiments may employ different configurations. For example, with regard to lenses and/or other optical elements, the optical sensor 220 and retro-modulator 225 may share optical elements and/or have a separate optical element for directing the first sub-portion 260 and/or second sub-portion 265 of the first portion 245 of light.

FIG. 2B illustrates how modulated light 290 travels through the optical assembly 200, once reflected off of the second mirror 285 of the retro-modulator 225. The first sub-portion 260 of light (illustrated in FIG. 2A) directed toward the retro-modulator 225 is reflected off of the second mirror 285 of the retro-modulator 225. And as the first sub-portion 260 of light passes through the modulator 280 (before and/or after being reflected off of the second mirror 285), the modulator 280 modulates the light, such that the modulated light 290 includes data to be sent back to the laser interrogator 120. The modulated light 290 then travels through the optical assembly 200 as illustrated in FIG. 2B, ultimately traveling through the optical scope 215 as outgoing light 295, and back to the laser interrogator 120.

As noted above, the aperture of the optical scope 215 may be the limiting aperture that determines the divergence of the outgoing light 295 as it travels back toward the laser interrogator 120. As such, a relatively large aperture may be selected to reduce divergence, thereby increasing the intensity of the outgoing light 295 and the distance over which the optical tag may engage in optical communication. For example, in some embodiments (as previously noted), the telescope has an aperture size of 90 mm (or more), resulting in a relatively large amount of light from the laser interrogator 120 being captured (where a divergence of the laser interrogator 120 is approximately 0.5-1 mrad) and having a return beam divergence of approximately 25 µrad (at 1550 nm wavelength). (In comparison, traditional optical tags having apertures of 6 mm, divergence is around 600 µrad.) As a result of the return beam having a much lower divergence, it has a higher intensity that can operate over long ranges. Some embodiments enable optical communications over distances of up to 150 km, for example. The optical scope 215 may offer some degree of magnification, depending on desired functionality. This can additionally enable it to operate over long ranges.

Figure 3:
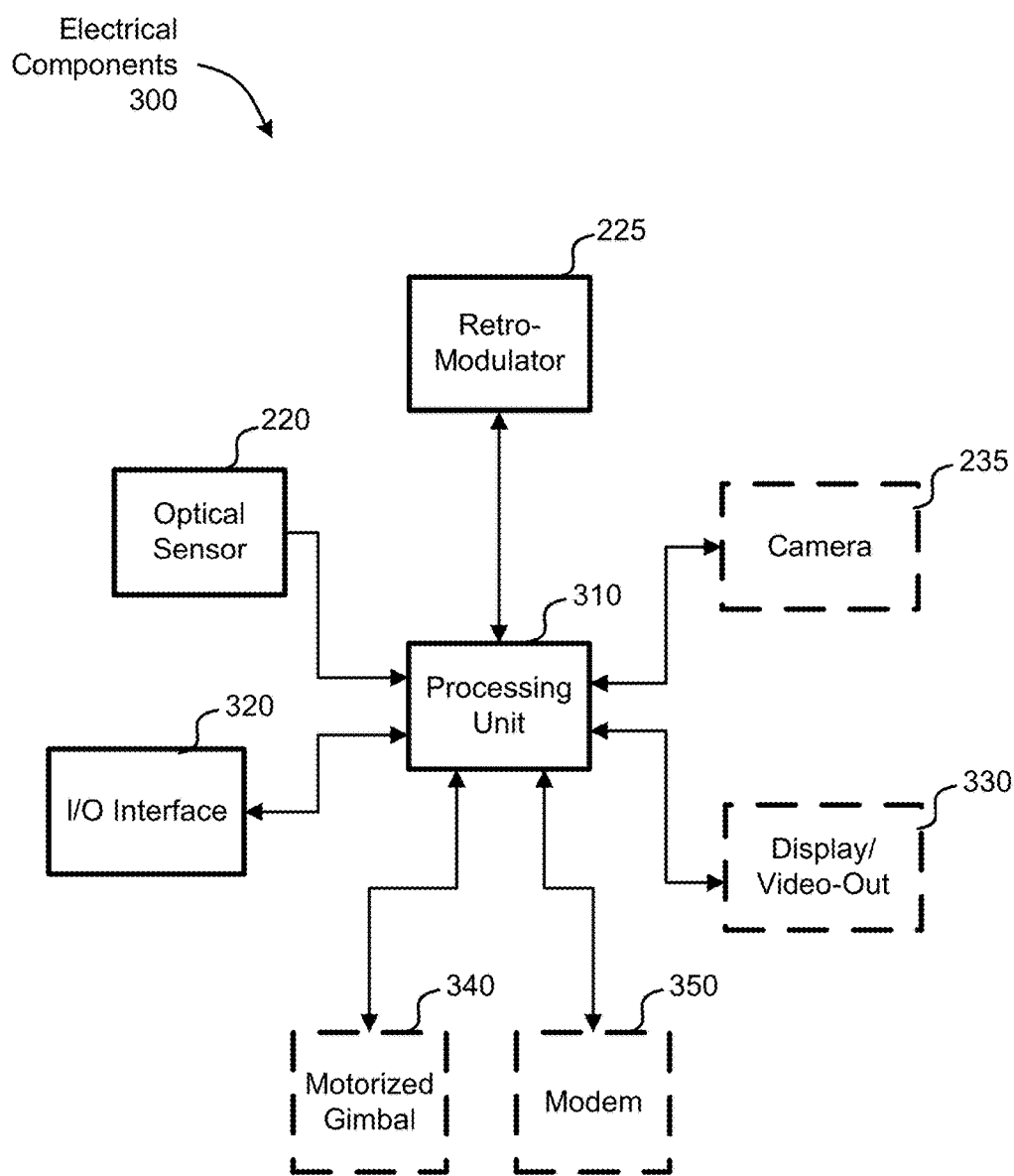
FIG. 3 is a block diagram of electrical components of an optical tag, according to some embodiments.

FIG. 3 is a block diagram of electrical components 300 of an optical tag 130, according to some embodiments. Here, blocks representing optional components are illustrated with dashed lines. That said, a person of ordinary skill in the art will appreciate that alternative embodiments may add, omit, combine, separate, or employee other variations from the electrical components 300 illustrated in FIG. 3. According to some embodiments, the electrical components may be housed in the same body as some or all of the optical components 200 illustrated in FIGS. 2A and 2B. Additionally, embodiments may use other components (e.g., a power supply) that are not illustrated in FIG. 3.

The processing unit 310 may comprise one or more processors generally configured to cause the various components of the optical tag 130 to provide to the optical communication described herein. In particular, the processing unit 310 can operate to obtain and process data from the optical sensor 220 (which may include demodulating raw data from the optical sensor 220), and provide that data to the I/O interface 320 to a tag-side communication device 140. The processing unit 310 can also obtain information from the tag-site communication device 140 (via the I/O interface 320) and drive the retro-modulator 225 (or, more specifically, the modulator 280 of the retro-modulator) accordingly, to communicate the information to the laser interrogator 120. To do so, the processing unit 310 may comprise without limitation one or more general-purpose processors (e.g. a central processing unit (CPU), microprocessor, and/or the like), one or more special-purpose processors (such as digital signal processing (DSP) chips, application specific integrated circuits (ASICs), and/or the like), and/or other processing structure or means.

It can be noted that the processing unit 310 may include an integrated memory, and/or the processing unit 310 may use a separate, discrete memory (not illustrated). In any case, the memory may comprise, without limitation, a solid-state storage device, such as a random access memory (RAM), and/or a read-only memory (ROM), which can be programmable, flash-updateable, and/or the like. Such storage devices may be configured to store software (e.g., firmware) and/or the like, executable by the processing unit 310. The source devices additionally or alternatively may be used to store file systems, data structures, and/or the like, to enable the functionality described herein.

The I/O interface 320 may comprise any of a variety of communication interfaces enabling the optical tag 130 to send and receive data from a tag-side communication device 140 for optical communication. As previously noted, this may comprise, an electrical connection (e.g., a universal serial bus (USB) connection), a wireless connection (e.g., Bluetooth, Wi-Fi, etc.), an optical datalink (e.g., via fiber optics), and/or the like.

As illustrated in FIGS. 2A and 2B, embodiments may further comprise a camera 235 to help users aim the optical tag 130 at the laser interrogator 120. Images and/or video from the camera 235 may be communicated to a display/video-out 330 to be displayed. As such, the display/video-out 330 may comprise a display screen (e.g., a liquid crystal display (LCD), light emitting diode (LED) display, or similar screen) coupled to and/or integrated into the optical tag 130, and/or a video-out interface (e.g., High-Definition Multimedia Interface (HDMI), display port (DP), USB Type-C, etc.) to allow the optical tag 130 to be connected with a separate display to allow for aiming of the optical tag 130. In some embodiments, the display/video-out 330 may comprise a wireless interface, enabling images and/or video from the camera 235 to be communicated wirelessly to a separate device.

As previously indicated, the electrical components 300 of some embodiments of an optical tag 130 may further include a motorized gimbal 340. The motorized gimbal 340 can be used to adjust the orientation of the optical tag for tracking or other purposes, and the processing unit 310 can operate one or more actuators of the motorized gimbal 340 to make such adjustments. For tracking, the processing unit 310 may obtain and process one or more images from the camera 235 to determine whether any orientation adjustments may be needed and, if so, make the adjustments by means of commands to the motorized gimbal 340.

Optionally, the electrical components 300 may include a modem 350. Here, the modem may be used to establish a secondary communication link between the optical tag 130 and laser interrogator 120. For instance, the modem 350 may be used to establish an order wire radio link between the optical tag 130 and laser interrogator 120, which, as noted previously, can be used for initial scanning and acquisition between the laser interrogator 120 and the optical tag 130. (It can be noted, however, that communications via the modem 350 may be secondary and less desirable to optical communications between the laser interrogator 120 and optical tag 130. This could be due to limitations (bandwidth, interference, range limitations, etc.) in the communication using the modem 350.)

Figure 4:
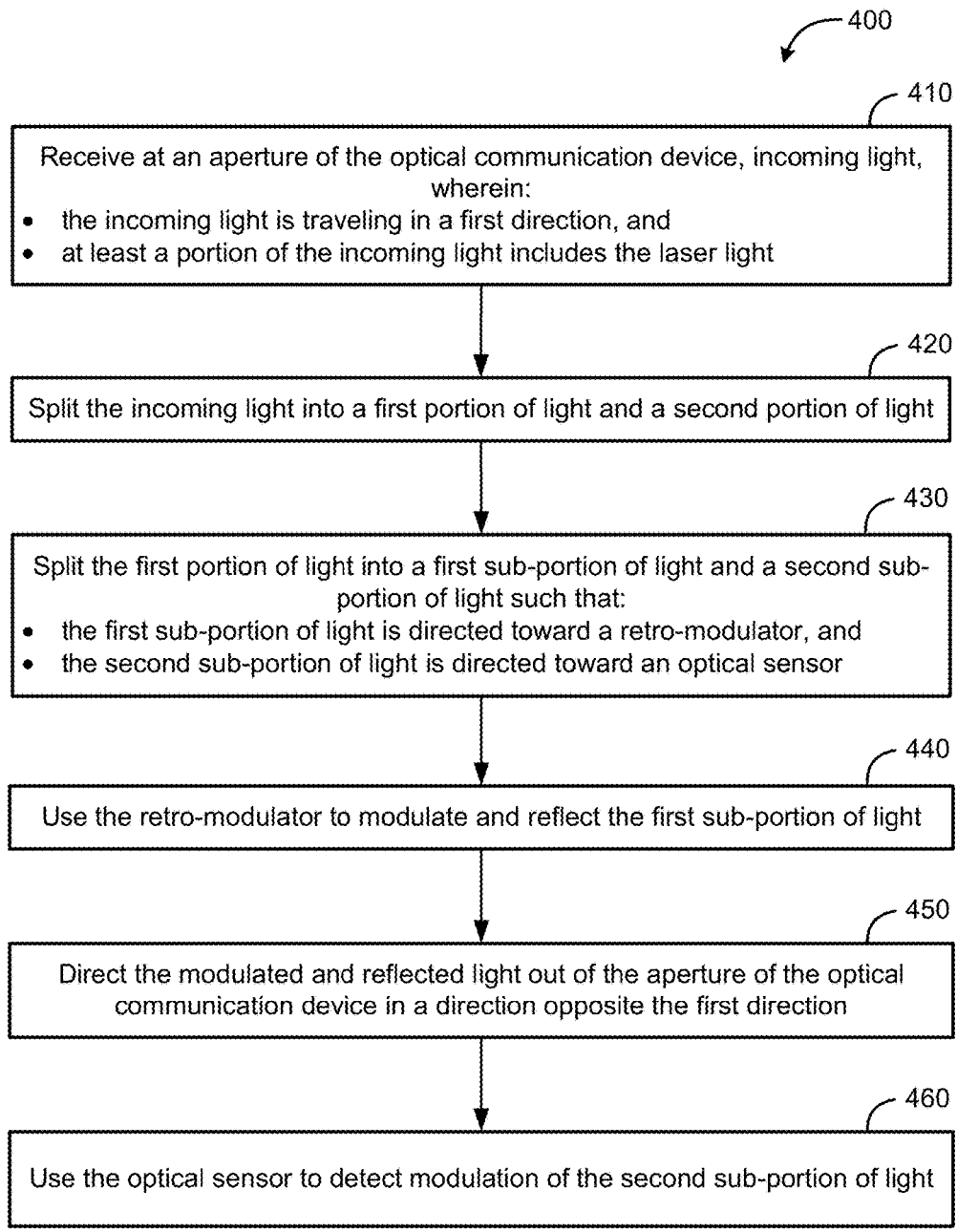
FIG. 4 is a process flow diagram of a method of detecting and retro-modulating laser light at an optical communication device, according to an embodiment.

FIG. 4 is a process flow diagram of a method 400 of detecting and retro-modulating laser light at an optical communication device, according to an embodiment. Here, the functionality of the blocks illustrated in FIG. 4 may be performed by an optical communication device, such as an optical tag 130 as described in relation to FIGS. 1-3. As such, means for performing the functionality described in one or more of the blocks illustrated in FIG. 4 may comprise one or more optical and/or electrical components of an optical tag, such as the components illustrated in FIGS. 2A, 2B, and 3.

At block 410, the functionality includes receiving at an aperture of the optical communication device, incoming light, where the incoming light is traveling in a first direction, and at least a portion of the incoming light includes the laser light. As noted above, the incoming light 205 of FIG. 2A may include not only the laser light, but all light entering an aperture (e.g. input aperture 210) of the optical communication device. This can include, for example, visible light and light outside the visible spectrum. In many embodiments, the laser light may be IR light, and thus may not be visible by the human eye. Additionally or alternatively, embodiments of an optical communication device may be configured to be coupled with an optical scope, or may integrate an optical scope there with. In which case, the method 400 may further comprise directing the incoming light through the aperture using an optical scope.

The functionality at block 420 comprises splitting the incoming light into a first portion of light in the second portion of light. As illustrated in FIG. 2A and described above, this can be done using a beam splitter (e.g. first beam splitter 240). According to some embodiments, and as noted previously, splitting the incoming light may comprise splitting the incoming light using a dichroic beam splitter that is configured to split the incoming light such that the first portion of light comprises infrared light and the second portion of light comprises visible light. Such embodiments may further utilize a camera configured to capture the second portion of light, enabling a user to see (e.g., on a display communicatively coupled with the camera) images from the camera to determine where the optical communication device is aimed. Because the second portion of light is coaxial with the incoming light, the images of where the optical communication device is aimed taken by the camera can be particularly accurate.

According to embodiments, the camera can take one or more images to capture the second portion of light. This may comprise, for example, the visible portion of light in embodiments in which the beam splitter splits the incoming light into visible and invisible portions. (Of course, in alternative embodiments, light may be split and/or filtered in different ways.) Embodiments may further utilize a tracking algorithm on the one or more images taken by the camera in conjunction with a motorized gimbal, in which case the method 400 may further comprise operating a motorized gimbal coupled with the optical communication device to track movement of a source of the laser light based, at least in part, on the one or more images.

The functionality at block 430 comprises splitting the first portion of light into a first sub-portion of light and a second sub-portion of light, such that the first sub-portion of light is directed toward a retro-modulator, and a second sub-portion of light is directed toward an optical sensor. As noted in the embodiments illustrated in FIGS. 2A and 2B, this can be done using a second beam splitter, which can be configured to split the light to balance several factors. These factors can include, for example, the dynamic range of the optical sensor, the dynamic range of the retro-modulator, the distance to the laser interrogator, the dynamic range of an optical sensor at the laser interrogator, and/or other such factors. In many applications, it may be desirable to direct a large majority of the light toward the retro-modulator. Accordingly, in certain embodiments of the method 400, splitting the first portion of light may comprise splitting the first portion of light such that the first sub-portion of light comprises 90% or more of the first portion of light. In some embodiments, the first sub-portion of light may comprise over 95% of the first portion of light. As illustrated in the embodiments shown in FIGS. 2A and 2B, additional optical elements may be used to direct the first sub-portion of light onto the retro-modulator. This can include, for example, a mirror and/or a positive lens. Thus, according to some embodiments, the method 400 may further include focusing, with a positive lens, the first sub-portion of light onto the retro-modulator.

At block 440, the functionality comprises using the retro-modulator to modulate and reflect the first sub-portion of light. Here, as indicated previously, the retro-modulator may comprise a modulator (e.g. an MQWM) coupled to a mirror. In some embodiments, the retro-modulator may be implemented in a semiconductor device transparent to the first sub-portion of light, where the MQWM is able to modulate the first sub-portion of light as the first sub-portion of light travels through the MQWM (before and/or after reflection on the mirror of the retro-modulator). In such embodiments, the mirror may comprise a deposited metal layer on a surface of the semiconductor device, opposite the surface through which the first sub-portion of light enters the semiconductor device.

At block 450, the functionality includes directing the modulated and reflected light out of the aperture of the optical communication device in a direction opposite the first direction. As illustrated in the embodiments shown in FIGS. 2A and 2B, the modulated and reflected light may be coaxial with the incoming light. And thus, the optical communication device acts as a true retro-reflector. The optical components of the optical communication device may be configured to provide this functionality. As illustrated in FIG. 2B, directing the modulated and reflected light out of the aperture of the optical communication device may be done via the first and second beam splitters.

At block 460, the functionality comprises using the optical sensor to detect modulation of the second sub-portion of light. As indicated in the embodiments described above, the optical sensor may comprise a PIN diode or similar photosensitive element coupled with an amplifier configured to amplify the electrical output of the photosensitive element. Special considerations may be made to help ensure the dynamic range of the optical element is suitable for the applications in which the optical communication device is used, taking into account the fact that embodiments may be capable of splitting the first portion of light in a way that accommodates the dynamic range of the optical sensor. The output of the optical sensor can then be provided to a processing unit or similar electrical circuitry for demodulation of the data encoded on the incoming laser light.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including components illustrated in FIG. 3), or may be embodied in sequences of machine-readable, or computer-readable, instructions, which may be used to cause a machine, such as a general-purpose or special-purpose processor (e.g., processing unit 310 of FIG. 3) or logic circuits programmed with the instructions, to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. An optical communication device comprising:
an aperture configured to allow incoming light to enter the optical communication device;
a first beam splitter configured to split the incoming light into a first portion of light and a second portion of light, such that the first portion of light is directed toward a second beam splitter;
the second beam splitter configured to split the first portion of light into a first sub-portion of light and a second sub-portion of light such that:
the first sub-portion of light is directed toward a retro-modulator, and
the second sub-portion of light is directed toward an optical sensor;
the retro-modulator configured to modulate and reflect the first sub-portion of light such that modulated and reflected light is directed out of the aperture via the second beam splitter and first beam splitter; and
the optical sensor configured to detect modulation of the second sub-portion of light.

2. The optical communication device of claim 1, further comprising a camera, wherein the first beam splitter is configured to direct the second portion of light toward the camera.

3. The optical communication device of claim 2, wherein the first beam splitter comprises a dichroic beam splitter configured to split the incoming light such that the first portion of light comprises infrared light and the second portion of light comprises visible light.

4. The optical communication device of claim 2, further comprising a processing unit configured to:
receive one or more images from the camera, and
control a motorized gimbal to track movement of a laser light source based, at least in part, on the one or more images.

5. The optical communication device of claim 1, further comprising an optical scope configured to direct the incoming light through the aperture.

6. The optical communication device of claim 5, wherein an input aperture of the optical scope has a diameter of at least 90 mm.

7. The optical communication device of claim 1, further comprising a negative lens positioned to direct the incoming light toward the first beam splitter.

8. The optical communication device of claim 1, further wherein the optical sensor comprises a PIN diode.

9. The optical communication device of claim 1, further comprising a positive lens configured to focus the second sub-portion of light onto the optical sensor.

10. The optical communication device of claim 1, further comprising a positive lens configured to focus the first sub-portion of light onto the retro-modulator.

11. The optical communication device of claim 1, wherein the retro-modulator comprises a multiple quantum well modulator (MQWM).

12. The optical communication device of claim 1, wherein the second beam splitter is configured to split the second portion of light such that the first sub-portion of the second portion of light comprises 90% or more of the second portion of light.

13. A method, at an optical communication device, of detecting and retro-modulating laser light, the method comprising:
receiving, at an aperture of the optical communication device, incoming light, wherein:
the incoming light is traveling in a first direction, and
at least a portion of the incoming light includes the laser light;
splitting the incoming light into a first portion of light and a second portion of light;
splitting the first portion of light into a first sub-portion of light and a second sub-portion of light such that:
the first sub-portion of light is directed toward a retro-modulator, and
the second sub-portion of light is directed toward an optical sensor;
using the retro-modulator to modulate and reflect the first sub-portion of light;
directing the modulated and reflected light out of the aperture of the optical communication device in a direction opposite the first direction; and
using the optical sensor to detect modulation of the second sub-portion of light.

14. The method of claim 13, further capturing one or more images using a camera configured to capture the second portion of light.

15. The method of claim 14, wherein splitting the incoming light comprises splitting the incoming light using a dichroic beam splitter configured to split the incoming light such that the first portion of light comprises infrared light and the second portion of light comprises visible light.

16. The method of claim 14, further comprising operating a motorized gimbal coupled with the optical communication device to track movement of a source of the laser light based, at least in part, on the one or more images.

17. The method of claim 13, further comprising directing the incoming light through the aperture using an optical scope.

18. The method of claim 13, wherein splitting the first portion of light comprises splitting the first portion of light such that the first sub-portion of light comprises 90% or more of the first portion of light.

19. The method of claim 13, wherein the retro-modulator comprises a multiple quantum well modulator (MQWM).

20. The method of claim 13, further comprising focusing, with a positive lens, the first sub-portion of light onto the retro-modulator.

* * * * *